United States Patent [19]

Mrozinski

[11] Patent Number: 4,863,792

[45] Date of Patent: Sep. 5, 1989

[54] MULTI-LAYER LAMINATES OF MICROPOROUS FILMS

[75] Inventor: James S. Mrozinski, Oakdale, Minn.

[73] Assignee: Minnesota Mining and Manufacturing Company, St. Paul, Minn.

[21] Appl. No.: 257,949

[22] Filed: Oct. 14, 1988

[51] Int. Cl.$^4$ .................... B32B 3/00; B32B 5/14; B32B 5/18

[52] U.S. Cl. .................... 428/315.5; 156/308.2; 156/308.6; 428/315.7; 428/316.6

[58] Field of Search .................... 156/308.2, 308.6; 428/315.5, 315.7, 315.9, 316.6

[56] References Cited

U.S. PATENT DOCUMENTS

| | | | |
|---|---|---|---|
| 4,187,390 | 2/1980 | Gore | 174/102 R |
| 4,247,498 | 1/1981 | Castro | 264/41 |
| 4,385,093 | 5/1983 | Hubis | 428/316.6 |
| 4,478,665 | 10/1984 | Hubis | 156/229 |
| 4,539,256 | 9/1985 | Shipman | 428/315.5 |
| 4,650,730 | 3/1987 | Lundquist et al. | 429/62 |
| 4,726,989 | 2/1988 | Mrozinski | 428/315.5 |

OTHER PUBLICATIONS

Smolders, van Aartsen & Steenbergen, Kolloid-Z.u.Z. Polymere, 243, 14–20 (1971).

ICI Americas Inc. Tech. Bulletin "The Processing of PTFE Coagulated Dispersion Powder", pp. 1–4.

Primary Examiner—William J. Van Balen
Attorney, Agent, or Firm—D. M. Sell; W. N. Kirn; C. Truesdale

[57] ABSTRACT

Multi-layer, microporous polyolefin sheet materials are provided. The sheet materials comprise at least two microporous polyolefin layers, the layers being autogenously bonded and having substantially the same porosity as prior to bonding.

8 Claims, 2 Drawing Sheets

MULTI-LAYER LAMINATES OF MICROPOROUS FILMS

BACKGROUND OF THE INVENTION

1. Field of the Invention

The present invention relates to multi-layer laminates of microporous films, a method for preparing same and articles prepared therefrom.

2. Background Information

Porous and microporous polymer films are well known in the art. The process of making these films to produce desirable properties usually involves stretching a film and this stretching process causes the film to become thinner.

There are many uses for microporous polymer films that are of a thickness that would require non-producible extrudates with thick cross-sections from the extruder before stretching. These films are not producible due to heat transfer, phase separation and precipitation limitations. To obtain the required film thickness layers of thin film can be laminated together.

Traditional bonding of porous polymer materials is done with either bonding agents or temperature/pressure techniques. Bonding agents or adhesives penetrate a significant distance into the pore network of the material thereby mechanically locking the layers in place. Temperature/pressure methods involve techniques of calendering, point bonding with a patterned nip, ultrasonic welding and the like. These methods generally alter the porosity of the layers at the interfaces and thus adversely affect the internal porosity and void volume of the laminated film. These methods can also have disadvantages of inclusion of non-polymer film material, contamination by foreign material, non-continuous interlayer bonding and inadequate inter-layer bonding. These boundary layer interruptions affect the utility of the layered film as a continuous, non-blocking and uniform gradient throughout the laminate is often desired.

U.S. Pat. No. 4,650,730 (Lundquist et al.) discloses a multiply sheet product useful as a battery separator having at least two plies each in the form of a microporous sheet of predetermined length and breadth and a thickness of less than 10 mils. The multiply sheet product is formed in conventional manners such as by coextensively overlaying at least one first sheet with at least one second sheet and subjecting them to nip rollers, calendering or the like. Alternatively, the sheet product can be formed by coating a second sheet with a first composition, normally of polymer and plasticizer, and then removing the plasticizer.

U.S. Pat. Nos. 4,385,093 and 4,478,665 (Hubis) disclose a multi-component, porous polytetrafluoroethylene (PTFE) article. Components of PTFE containing a liquid lubricant are placed in intimate contact, dried to remove the liquid lubricant and then stretched in one or more directions. The intimacy of contact between components can be enhanced by applying a compressive force such as by using a press or a set of calender rolls for contact.

PTFE exhibits cold flow properties and calendering PTFE not only reduces the thickness of the calendered sheet but also causes PTFE layers to cold weld. This cold welding or cold flowing causes the bonding of this invention.

U.S. Pat. No. 4,187,390 (Gore) and ICI Americas Inc. Technical Bulletin "The Processing of PTFE Coagulated Dispersion Powders," pp. 1-4, describe forming PTFE through compression or shear forces.

U.S. Pat. No. 4,247,498 (Castro) discloses microporous polymers characterized by a relatively homogeneous, three-dimensional cellular structure having cells connected by pores of smaller dimension. The microporous polymers are prepared from thermoplastic polymers by heating a mixture of the polymer and a compatible liquid to form a homogeneous solution, cooling the solution under non-equilibrium thermodynamic conditions to initiate liquid-liquid phase separation, and continuing the cooling until the mixture achieves substantial handling strength.

U.S. Pat. No. 4,539,256 (Shipman) discloses a microporous sheet material characterized by a multiplicity of spaced randomly dispersed, equiaxed, non-uniform shaped particles of the thermoplastic polymer, adjacent thermoplastic particles connected to each other by a plurality of fibrils of the thermoplastic polymer. The sheet materials are prepared by melt blending crystallizable thermoplastic polymer with a compound which is miscible with the thermoplastic polymer at the melting temperature of the polymer but phase separates on cooling at or below the crystallization temperature of the polymer, forming a shaped article of the melt blend, cooling the shaped article to a temperature at which the polymer crystallizes to cause phase separation to occur between the thermoplastic polymer and the compound.

U.S. Pat. No. 4,726,989 (Mrozinski) discloses microporous materials incorporating a nucleating agent made by melt blending a crystallizable thermoplastic polymer with a nucleating agent which is capable of inducing subsequent crystallization of the thermoplastic polymer and with a compound which is miscible with the thermoplastic polymer at the melting temperature of the polymer but phase separates on cooling at or below the crystallization temperature of the polymer, forming a shaped article of the melt blend, cooling the shaped article to a temperature at which the nucleating agent induces the thermoplastic polymer to crystallize so as to cause phase separation to occur between the thermoplastic polymer and the compound.

SUMMARY OF THE INVENTION

The present invention relates to multi-layer, microporous polyolefin sheet materials comprising at least two microporous polyolefin layers, the layers being autogenously bonded and having substantially the same porosity as prior to bonding. The layers can have the same or different porosities and the layers can be of the same or different polyolefin, e.g., polyethylene, polypropylene or a combination thereof. The layers can have the same effective pore size or the layers can have different effective pore sizes to produce, for example, a gradient effective pore size through the material.

Surprisingly, no additional external physical means are required for the bonding to take place. Thus, the interlayer boundaries of the laminate are not distorted and each sheet of the laminate retains its properties to the interface with the next sheet.

The advantages of the type of interlayer bonding of the present invention are high interlayer bond strength, retention of individual layer properties without interference from an artificial bond, and to bond layers with dissimilar properties. For example, porosity and void volume of a laminate of similar sheets would be the same as the individual sheets before bonding. Also these properties can be tailored to fit various requirements by changing the properties of each sheet of the laminate.

The present invention further relates to a method of making multi-layer, microporous polyolefin sheet materials comprising the steps of (a) forming at least two microporous polyolefin layers by melt blending the polyolefin with an additive which is miscible with the polymer at the melt temperature of the blend but which phase separates on cooling, forming a layer from the solution, cooling the layer at a rate and to a temperature to initiate non-equilibrium phase separation, and cooling to solidify the layer;

(b) extracting the additive from each layer with a solvent capable of swelling the polyolefin and contacting the solvent wet layers or contacting the solvent wet layers and extracting the additives from the contacting layers; and (c) drying the contacting layers to remove the solvent and effect bonding between the contacting layers.

Surprisingly, multi-layer bonding of microporous polyolefin sheets of the present invention is achieved without the use of bonding agents such as adhesives, without the use of external compression forces such as calendering, and without the use of the application of heat to form the laminate. All of these externally applied perturbations to the laminate can cause undesirable affects at the interlayer boundaries.

The layers can be optionally oriented prior to removal of the additive or after drying and bonding the layers. The bond formed between layers during drying is generally stronger than the integrity within the layers.

DETAILED DESCRIPTION OF THE INVENTION

Figure 1:
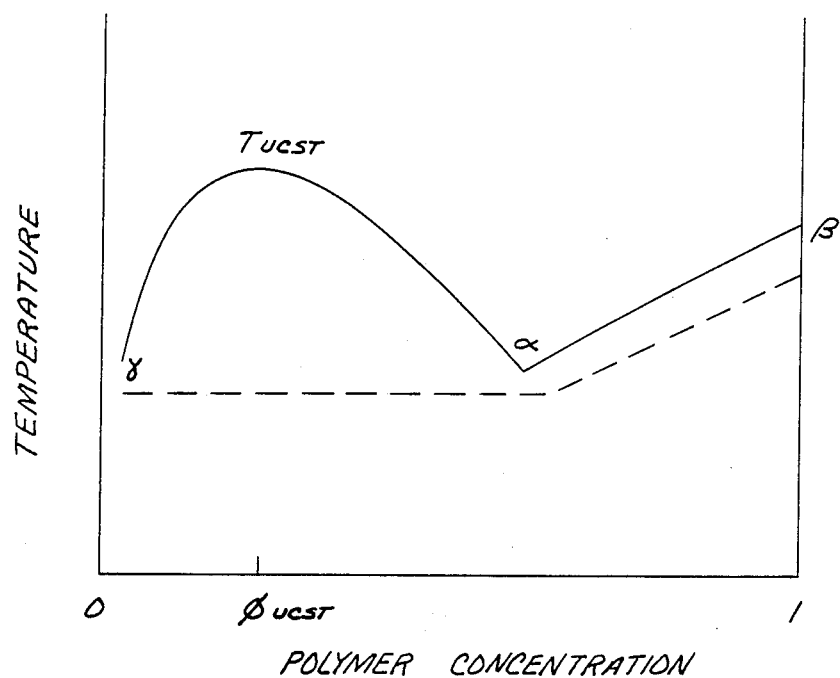
FIG. 1 is a temperature-composition plot for the thermoplastic polymer/compatible liquid systems of the invention.

The microporous polyolefin layers useful in the present invention can be formed by either liquid-liquid thermodynamic, non-equilibrium phase separation or liquid-solid thermodynamic, non-equilibrium phase separation. When liquid-liquid phase separation occurs, the cells comprise void spaces encased by fibrous, lacy, or semi-continuous boundaries. Upon orientation, the cells become elongated in the direction of orientation. The cells of the oriented article are generally ellipsoidal in shape with an aspect ratio of major axis to minor axis greater than 1.0 and a major axis generally lying in a plane parallel to the surface of the article. When liquid-solid phase separation occurs, the material has an internal structure characterized by a multiplicity of spaced, randomly disposed, non-uniform shaped, equiaxed particles of thermoplastic polymer, adjacent particles throughout said material being separated from one another to provide the material with a network of interconnected micropores and being connected to each other by a plurality of fibrils consisting of the thermoplastic polymer. The fibrils elongate upon orientation providing greater spacing between the thermoplastic polymer particles and increased porosity. Liquid-liquid phase separation is described, for example, in U.S. Pat. No. 4,247,498 (Castro) and liquid-solid phase separation is described, for example, in U.S. Pat. No. 4,539,256 (Shipman), both of which are incorporated herein by reference.

Polyolefins useful in the present invention preferably include the polymers of ethylene and propylene but also may include polymers of 1-octene, 1-butene, 1-methyl-4-pentene, styrene, and the like, and copolymers and blends of two or more such olefins that may be polymerized to contain crystalline and amorphous segments and mixtures of stereo-specific modification of such polymers, e.g., mixtures of isotactic polypropylene and atactic polypropylene, isotactic polystyrene and atactic polystyrene.

The additive which is melt-blended with the polyolefin is a material which is capable of forming a solution with the thermoplastic polymer when heated above the melt temperature of the polymer and which phase separates from the polymer on cooling. The compatibility of the liquid with the polymer can be determined by heating the polymer and the liquid to form a clear homogeneous solution. If a solution of the polymer and the liquid cannot be formed at any liquid concentration, then the liquid is inappropriate for use with that polymer. In practice, the liquid used may include compounds which are solid at room temperature but liquid at the melt temperature of the polymer. Generally, for non-polar polyolefin polymers, non-polar organic liquids with similar room temperature solubility parameters are generally useful at the solution temperatures. Blends of two or more liquids can be used as the compatible liquid as long as the selected polymer is soluble in the liquid blend at the polymer melt temperature and the solution formed phase separates on cooling.

Various types of organic compounds have been found useful as the compatible liquid, including aliphatic and aromatic acids, aliphatic, aromatic and cyclic alcohols, primary and secondary amines, aromatic and ethoxylated amines, diamines, esters and diesters, ethers, ketones and various hydrocarbons and heterocyclics.

When the polymer selected is polypropylene, aliphatic hydrocarbons such as mineral oil, esters such as dibutyl phthalate and ethers such as dibenzyl ether are useful as the compatible liquid. When high density polyethylene is the polymer, an aliphatic hydrocarbon such as mineral oil or and aliphatic ketone such as methyl nonyl ketone or an ester such as dioctyl phthalate are useful as the compatible liquid. Compatible liquids for use with low density polyethylene include aliphatic acids such as decanoic acid and oleic acid or primary alcohols such as decyl alcohol.

The actual polymer concentration selected from within the predetermined concentration range for the liquid-polymer system being used is limited by functional considerations. The polymer concentration and molecular weight should be sufficient to provide the microporous structure which is formed on cooling with adequate strength for handling in further processing steps. The polymer concentration should be such that the viscosity of the liquid-polymer melt solution is suitable for the equipment used to shape the article. Generally, the polymer concentration in the compatible liquid is about 10 to 80 weight percent, which corresponds to a compatible liquid concentration of 20 to 90 weight percent.

The relative amounts of thermoplastic polymer and compatible liquid vary with each system. The polymer concentration which can be used in a given system can be determined by reference to the temperature-composition graph for a polymer-liquid system as set forth in FIG. 1 Such graphs can be readily developed by known techniques such as set forth in Smolders, van Aartsen and Steenbergen, Kolloid-Z.u.Z. Polymere, 243,14–20 (1971).

The portion of the curve from gamma to alpha represents the thermodynamic equilibrium liquid-liquid phase separation. $T_{ucst}$ represents the upper critical solution temperature, i.e., the maximum temperature of the system at which liquid-liquid phase separation will occur. $\Phi_{ucst}$ represents the critical composition. To form the microporous polymers of the present invention, the polymer concentration utilized for a particular system must be greater than $\Phi_{ucst}$. If the polymer concentration is less than this, the phase separation which occurs as the system is cooled forms a continuous liquid phase with a discontinuous polymer phase, resulting in a structure which lacks sufficient integrity.

The portion of the curve from alpha to beta represents equilibrium liquid-solid phase separation. Alternatively, the compatible liquid can be chosen such that the thermoplastic polymer and compatible liquid system will exhibit liquid-solid phase separation or liquid-liquid phase separation over the entire composition range. For a given cooling rate in a system, the crystallization temperature-concentration curve of the compatible liquid can be determined and from this curve the concentration ranges for the polymer and the liquid which will yield the desired microporous structure at the given cooling rate can be determined. The determination of the crystallization curve is an alternative to determining the temperature-concentration phase diagram for a system incorporating a semicrystalline polymer.

In the process of the Present invention, the rate of cooling of the solution may be varied within wide limits as long as the rate is sufficient that the phase separation does not occur under thermodynamic equilibrium conditions. For many liquid-polymer systems, when the rate of cooling of the liquid-polymer solution is slow, but sufficient to result in liquid-liquid phase separation, liquid-liquid phase separation occurs at substantially the same time as the formation of a plurality of liquid droplets of substantially uniform size. When the cooling rate is such that the droplets form, the resultant microporous polymer will have a cellular microstructure. If the rate of cooling of the liquid-polymer solution is rapid, the solution undergoes a spontaneous transformation called spinodal decomposition, the resultant microporous polymer will have a fine open-cellular microstructure. The fine microporous structure is referred to as a lacy structure. For many polymer systems which include a crystalline polymer, when the rate of cooling is sufficient to result in liquid-solid phase separation, the resulting microporous polymer will have spherulitic microstructure. Thus, differing microporous structures can be obtained by either liquid-liquid or liquid-solid phase separation techniques by varying the cooling rate and the liquid-polymer system used.

The additive is removed from the formed structure by solvent extraction either before or after the layers are brought into contact for bonding, the solvent replacing the additive in the pores of the polyolefin material. Replacing the additive with solvent before contacting the sheets has the advantages of easier and faster additive removal because the individual sheets are thinner and allow the more viscous additive to be removed more easily.

Any solvent capable of extracting the additive from the polyolefin sheet material and swelling the polyolefin polymer can be used as the extraction solvent in the method of the present invention. Generally, alkanes, halogenated alkanes, alcohols, ketones, and aromatic solvents are suitable for additive extraction. Such extraction solvents include 1,1,1-trichloroethane, methylethyl ketone, toluene, and isopropyl alcohol.

After the additive has been removed by solvent extraction and the microporous polyolefin sheets to be laminated are brought into contact, the solvent is allowed to evaporate and the sheets bond to each other at the contacting surfaces.

The formed sheets should be handled such that the sheets do not dry before being brought into contact with each other. Either additive or extraction solvent should remain in the sheets until they are brought into contact with each other.

The additives used in making the microporous polyolefin articles tend to swell the polymer by absorbing into the amorphous regions of the polymer. The solvents used for additive removal swell or absorb into the same amorphous portions until the solvent dries. Upon drying the polymer shrinks somewhat. It is believed that during the bonding process of this invention the extraction solvent causes the polymer sheets to swell and since the polymer sheets are in intimate contact, upon drying, the swollen polymer shrinks and causes point to point contact of the polymer nodes, where an adsorptive bond develops between the polymer surfaces. Adsorptive bonding is the adhesion in an extremely thin layer of molecules to the surfaces of solid bodies with which they are in contact.

Surprisingly, no additional external physical means are required for the bonding to take place. Thus, the interlayer boundaries of the laminate are not distorted and each sheet of the laminate retains its properties to the interface with the next sheet.

The advantages of the type of interlayer bonding of the present invention are high interlayer bond strength, retention of individual layer properties without interference from an artificial bond, and to bond layers with dissimilar properties. For example, porosity and void volume of a laminate of similar sheets would be the same as the individual sheets before bonding. Also these properties can be tailored to fit various requirements by changing the properties of each sheet of the laminate.

After removal of the compatible liquid and, optionally, orientation, the resulting microporous material may be modified by imbibition of various materials, such as, for example, liquids, solvent solutions, solvent dispersions, or solids. Such materials may be imbibed by any of a number of known methods which result in the deposition of such materials within the porous structure of the microporous material. The imbibed material may be physically entrapped within the microporous structure or chemically reacted with the polymeric material of the microporous structure. Examples of imbibing materials include medicaments, fragrances, antistatic agents, surfactants, and pesticides. The thermoplastic polymer may be imbibed with a urethane monomer which is them polymerized in situ to provide a liquid-impermeable, vapor-permeable material.

Microporous laminated sheets of the present invention may be useful in a wide variety of applications such as tapes, pinhole-free packaging, battery separators, wound dressings, and filters. Controlled porous composites are obtainable by bonding dissimilar materials together, each material having individually controlled porous properties. Delicate high porosity sheets can be bonded between stronger lower porosity sheets to produce a handleable filter material. Other filter products, using a gradient of pore sizes would allow higher filter capacity and longer filter life.

This invention is further illustrated by the following examples. In the examples all parts and percentages are by weight unless otherwise specified. In the examples, the values reported for "Gurley Seconds" are measurements of the time in seconds needed to pass 50 cc of air through the sheet material according to ASTM-D-792-58, Method A. The density is measured in grams/cc determined according to the specific gravity measurement of ASTM-D-792-66. The void volume is based on the measured density of the porous membrane and the given density of the polymer according to the following formula:

$$\text{Void Volume} = \left[ 1 - \frac{\text{measured membrane density}}{\text{given polymer density}} \right] \times 100\%$$

EXAMPLE 1

A 0.3 mm thick sheet of material was prepared using the liquid-solid phase separation method described in U.S. Pat. No. 4,539,256 with a composition of about 26 weight percent high density polyethylene having a melt flow index of about 0.07 (available under the trade designation GM 9255 F2 from American Hoechst Company, Leominster, Massachusetts) and about 74 weight percent mineral oil (available under the trade designation AMOCO TM White Mineral Oil #31 USP Grade from Amoco Oil Company). The polyethylene/mineral oil blend was melt extruded on a 40 mm twin screw extruder maintained at a 160° C melt temperature through a 30.5 cm casting die gapped at 0.05 cm onto a casting wheel maintained at 32° C. Five sheets of this material were soaked in 1,1,1-trichloroethane to remove and replace the mineral oil. The solvent-wet sheets were stacked on top of each other and mounted on a restraining frame for drying at which time the sheets began to shrink causing them to become taut in the frame where an adsorptive bond developed between the layers. The dried composite was biaxially stretched 3×3 at 82° C. and heat treated at 95° C. for 1 minute. Attempts to separate the layers of the porous material by hand before or after biaxial stretching indicated the layers were sufficiently bonded and could not be separated. The 5-layer microporous polyolefin sheet material had a Gurley value of 50.4 seconds, a density of 0.082 g/cc, a void volume of 91.4%, and a thickness of 0.66 mm.

EXAMPLE 2

A 0.1 mm thick sheet of material was prepared using liquid-solid phase separation and incorporating a nucleating agent as described in U.S. Pat. No. 4,726,989 with a composition of about 40 weight percent polypropylene having a melt flow index of 0.8 (available under the trade designation Pro-fax TM 6723 from Himont Incorporated, Wilmington, Delaware) and about 60 weight percent mineral oil. This blend incorporated about 0.3 weight percent (based on polymer weight) dibenzylidene sorbitol nucleating agent (available from Milliken Chemical under the trade designation Millad TM 3905) which was dry-dusted on the polypropylene pellets before extrusion. The polypropylene/mineral oil blend was melt extruded on a 40 mm twin screw extruder maintained at a 205° C. melt temperature through a 30.5 cm casting die gapped at 0.05 cm onto a casting wheel maintained at 49° C. Two sheets of this material were soaked in 1,1,1-trichloroethane to remove and replace the mineral oil. The solvent-wet sheets were stacked on each other and mounted on a restraining frame for drying. As the sheets dried, they shrank and became taut in the frame where an adsorptive bond developed between the layers. The dried composite was biaxially stretched 2.5×2.5 at 95° C. Attempts to separate the layers of the porous material by hand before or after biaxial stretching indicated the layers were sufficiently bonded and could not be separated. The 2-layer microporous polypropylene sheet material had a Gurley value of 13.4 seconds, a density of 0.193 g/cc, a void volume of 78.6%, and a thickness of 0.10 mm.

Figure 2:
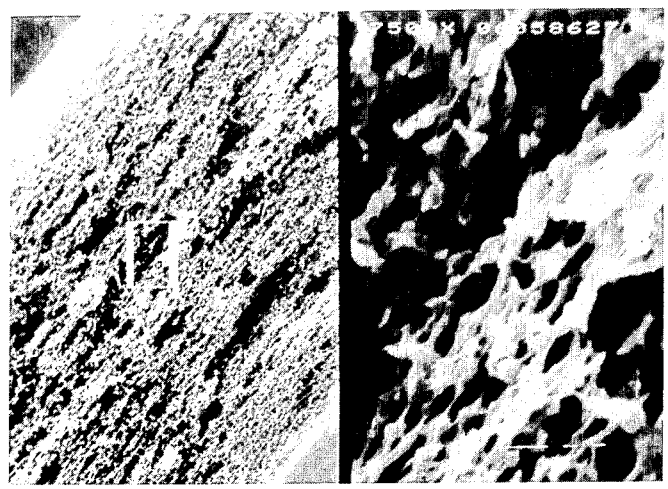
FIG. 2 is a photomicrograph of the cross-sectional interfacial boundary area of two microporous polypropylene layers of Example 2 of the present invention.

FIG. 2 is a photomicrograph of the cross-sectional interfacial boundary area of two polypropylene microporous sheets made according to Example 2 of the present invention. The left half of the photomicrograph is shown at a magnification of 1000×, and a portion of the left half (identified by a small rectangular border within the left half) is further enlarged to a magnification of 10,000× and is presented as the right half of the photomicrograph in order to show further detail of the cross-sectional interfacial boundary area of the microporous sheets. The bar marker placed in the lower right corner of the right half of the photomicrograph (solid white line followed by a double dash) is a scale marker indicating length. The solid white line portion of the bar marker represents 10 microns in the left half and 1 micron in the right half of the photomicrograph.

Figure 3:
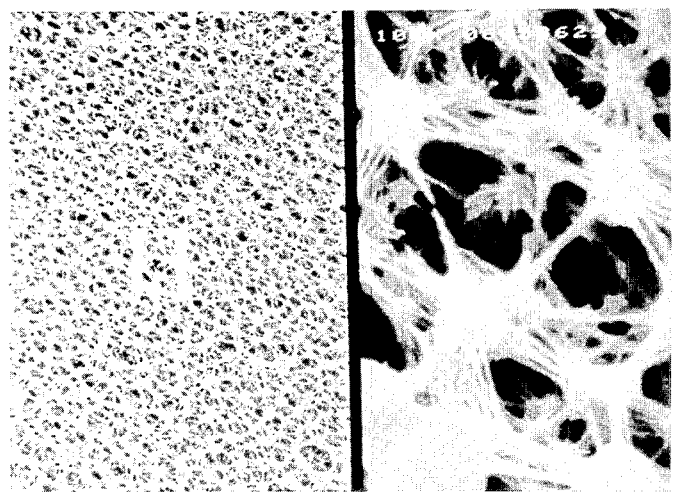
FIG. 3 is a photomicrograph of the surface of the bonded polypropylene layer of Example 2 of the present invention.

FIG. 3 is a photomicrograph of the surface structure of the microporous laminate of FIG. 2 at the same split screen magnifications, 1000× left half and 10,000× right half.

EXAMPLE 3

A 0.17 mm thick sheet of material was prepared using liquid-liquid phase separation as described in U.S. Pat. No. 4,247,498 with a composition of about 41 weight percent polypropylene (PRO-FAX TM 6723) and about 59 weight percent N,N-bis(2-hydroxyethyl) tallowamine (available under the trade designation Armostat TM 310 from Armak Chemical). The polypropylene/tallowamine blend was melt extruded on a 1″ Killion extruder maintained at a 260° C. melt temperature through a casting die gapped at 15.2×0.0178 cm onto a casting wheel maintained at 60° C. Two sheets of this material were soaked in 1,1,1-trichloroethane to remove and replace the tallowamine. The solvent wet sheets were stacked on each other and mounted on a restraining frame for drying. As the sheets dried they shrank and became taut in the frame where an adsorptive bond developed between the layers. The dried composite was biaxially stretched 2.0×2.0 at 121° C. Attempts to separate the layers of the porous material by hand before or after biaxial stretching indicated the layers were sufficiently bonded and could not be separated. The 2-layer microporous polypropylene sheet material has a Gurley value of 44.2 seconds, a density of 0.166 g/cc, a void volume of 81.6%, and a thickness of 0.21 mm.

EXAMPLE 4

A single sheet of polypropylene/mineral oil material prepared as in Example 2 and a single sheet of polyethylene/mineral oil) prepared as in Example 1 were soaked in 1,1,1-trichloroethane to remove and replace the mineral oil. The solvent wet sheets were stacked on each other and mounted on a restraining frame for drying. As the sheets dried, they shrank and became taut in the frame where a bond developed between the layers. The dried composite was biaxially stretched 2.5×2.5 at 85° C. Attempts to separate the layers of the porous material by hand before or after biaxial stretching indicated the layers were sufficiently bonded. The 2-layer microporous polypropylene/polyethylene sheet material had a Gurley value of 14.5 seconds, a density of 0.158 g/cc, a void volume of 83%, and a thickness of 0.11 mm.

EXAMPLE 5

Two sheets of polyethylene/mineral oil were prepared according to the liquid-solid phase separation method of Example 1, except that the first sheet contained 49 weight percent polyethylene and 51 weight percent mineral oil and and the second sheet contained 34 weight percent polyethylene and 66 weight percent mineral oil. A sample of each sheet was individually soaked in 1,1,1-trichloroethane to remove and replace the mineral oil. Each solvent-wet sheet was individually mounted in a restraining frame, dried and biaxially stretched 3×3 at 88° C. The sheet prepared using 49 weight percent polyethylene and 51 weight percent mineral oil had a Gurley value of 42.4 seconds, a density of 0.253 g/cc, a void volume of 73.5%, and a thickness of 0.05 mm. The sheet prepared using 34 weight percent polyethylene and 66 weight percent mineral oil had a Gurley value of 20.4 seconds, a density of 0.103 g/cc, a void volume of 89.2%, and a thickness of 0.03.

Another sample of each sheet was soaked in 1,1,1-trichloroethane to remove and replace the mineral oil. The solvent wet sheets were stacked and mounted on a restraining frame for drying. As the sheets dried, they shrank and became taut in the frame where an adsorptive bond developed between layers. The dried composite was biaxially stretched 3×3 at 88° C. Attempts to separate the layers of the porous material by hand before or after biaxial stretching indicated the layers were sufficiently bonded and could not be separated. The 2-layer polyethylene microporous sheet material had a Gurley value of 71.2 seconds, a density of 0.176 g/cc, a void volume of 81.5%, and a thickness of 0.08 mm.

COMPARATIVE EXAMPLE 1

Two sheets of dry, unstretched polytetrafluoroethylene (PTFE) were imbibed with a processing aid, Isopar TM M (isoparaffinic petroleum hydrocarbon solvent available from Exxon Co.) and solvent washed to remove the Isopar TM M. The solvent-wet sheets were stacked, mounted on a restraining frame, and allowed to dry. After drying, the layered PTFE sheets were removed from the frame. The sheets had not bonded and fell apart immediately upon removal from the frame.

COMPARATIVE EXAMPLE 2

Two sheets of freshly processed PTFE sheet material containing 82 weight percent PTFE and 18 weight percent Isopar TM M were solvent washed with 1,1,1-trichloroethane to remove the Isopar TM M. The solvent wet sheets were stacked, mounted on a restraining frame, and allowed to dry. After drying, the layered PTFE sheets were removed from the frame. The sheets had not bonded and fell apart immediately upon removal from the frame.

Various modifications and alterations of this invention will be apparent to those skilled in the art without departing from the scope and spirit of this invention and this invention should not be restricted to that set forth herein for illustrative purposes.

What is claimed is:

1. Multi-layer, microporous polyolefin sheet materials comprising at least two microporous polyolefin layers, the layers being autogenously bonded and having substantially the same porosity as prior to bonding.

2. The sheet material of claim 1 wherein said layers have the same porosities.

3. The sheet material of claim 1 wherein said layers have different porosities.

4. The sheet material of claim 1 wherein said layers are of the same polyolefin material.

5. The sheet material of claim 1 wherein said layers are of different polyolefin material.

6. The sheet material of claim 1 wherein said polyolefin is polyethylene, polypropylene or a combination thereof.

7. A method of making multi-layer, microporous polyolefin sheet materials comprising the steps of
 (a) forming at least two microporous polyolefin layers by melt blending the polyolefin with an additive which is miscible with the polymer at the melt temperature of the blend but which phase separates on cooling, forming a layer from the solution, cooling the layer at a rate and to a temperature to initiate non-equilibrium phase separation, and cooling to solidify the layer;
 (b) extracting the additive from each layer with a solvent capable of swelling the polyolefin and contacting the solvent wet layers or contacting the solvent wet layers and extracting the additives from the contacting layers; and
 (c) drying the contacting layers to remove the solvent and effect bonding between the contacting layers.

8. The method of claim 7 further comprising orienting said sheet materials.

* * * * *